INTERCOMMUNICATION APPARATUS

Filed Dec. 17, 1959 2 Sheets-Sheet 1

INVENTOR.
LAVERNE E. BLANK
BY
Mason, Kolehmainen, Rathburn and Wyss
ATTORNEYS.

Nov. 13, 1962 L. E. BLANK 3,064,082

INTERCOMMUNICATION APPARATUS

Filed Dec. 17, 1959 2 Sheets-Sheet 2

United States Patent Office
3,064,082
Patented Nov. 13, 1962

3,064,082
INTERCOMMUNICATION APPARATUS

Laverne E. Blank, Racine, Wis., assignor to Webster Electric Company, Racine, Wis., a corporation of Delaware Filed Dec. 17, 1959, Ser. No. 860,189
6 Claims. (Cl. 179—37)

The present invention relates to intercommunication apparatus and more particularly to intercommunication apparatus of the loud-speaking type.

One of the primary objects of the present invention is the provision of a communication system of the loud-speaker type including master and remote stations with a new and improved signalling means for providing an indication at either or both the master and remote stations if a master station is eavesdropping upon it.

A further object of the present invention is the provision of an intercommunication system of the type described above in conjunction with busy signalling means.

In brief, the system of the present invention may include one or more stations of the master type provided with amplifying means, communication direction controlling switch means and station selector switches and one or more remote stations including having translating means used for both reception and transmitting and in which one or both types of stations are provided with signalling means adapted to be operated in response to selection thereof by operation of an associated station selector switch at a master station. The arrangement utilizes interstation communication circuits and is such that it can be combined in simple manner with busy signalling means.

Figure 1:
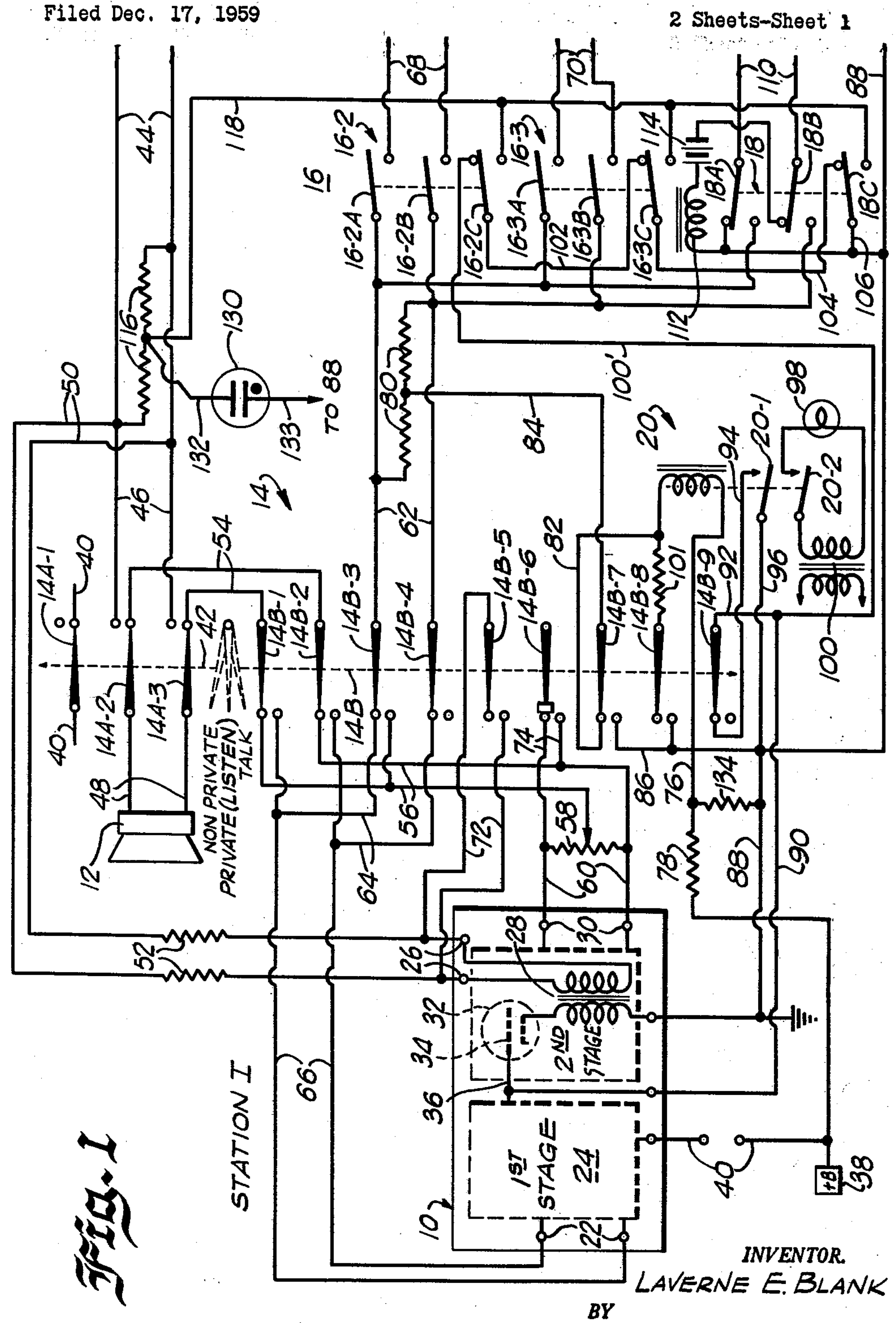
Figure 2:
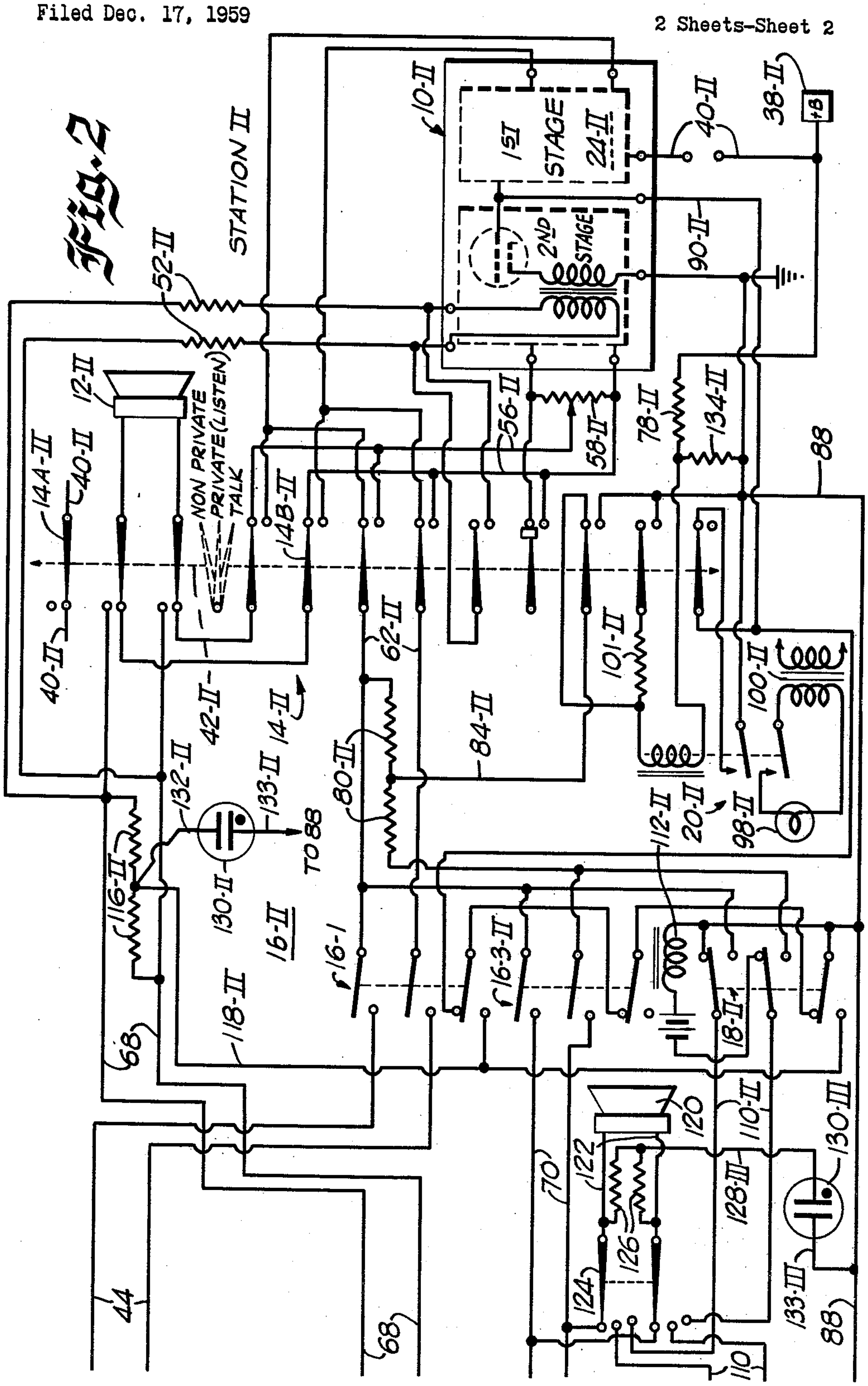

Other objects and advantages of the present invention will become apparent from the ensuing description of an illustrative embodiment thereof in the course of which reference is had to the accompanying drawings, in which:

FIG. 1 illustrates diagrammatically a master station provided with an intercommunication unit constructed in accordance with the present invention; and FIG. 2 illustrates a second station of the system with a unit corresponding to the first and including also a third station of a remote type.

Referring now to the drawings, the intercommunication system illustrated is shown to include three stations, numbered I, II and III, of which Stations I and II are master stations and Station III is a remote station. The system is shown as being of the type disclosed and claimed in my copending application Serial No. 728,007, filed April 11, 1958 and assigned to the assignee of this application. This system is shown in conjunction with the signalling means of the present invention.

The apparatus at Station I includes an amplifier 10, a transducer 12 utilized both as a loud-speaking receiver and transmitter, a multiposition communication control switch generally called a talk-listen switch and indicated generally by the reference character 14, a group of station selector switches 16, a call-in switch 18, and a busy signal and amplifier controlling relay 20.

The amplifier 10 may be in general of known construction but including first or main input terminals 22 leading to a first stage amplifier 24, a second or intermediate stage input terminal 26 leading to a second stage input transformer 28 and output terminals 30. The second stage is shown as including a tube 32 having an input grid 34, to which is connected an interstage lead 36, and a cathode in circuit with which is the input transformer 28. It should be noted though that a transistor type second stage could be used with the input transistor in either the base or emitter circuit. The amplifier may be supplied with B potential from any suitable source 38 through conductors 40 adapted to be coupled through talk-listen switch blade 14A–1 in the indicated position of the talk-listen switch. The negative terminal of the B supply is grounded, i.e. thus connected to conductor 88.

The communication control switch 14 includes two sections 14A and 14B and is operable manually by an actuator 42 between the indicated middle position, termed a private (and listen) position, to an upper non-private (also a listen) position and a lower talk position. The details of the switch have not been illustrated other than diagrammatically but it may be of known type of construction. When the actuator 42 is moved to its upper position, only the upper switches 14A–1, 14A–2 and 14A–3 are actuated, they being moved from their indicated to their upper positions. During this movement the lower switch blades, which are nine in number and indicated by the reference characters 14B–1 to 14B–9, remain in their indicated positions. When the actuator 42 is moved to its lower and talk position, the switch blades 14A–1, 14A–2 and 14A–3 remain in their indicated positions whereas the lower switch blades 14B–1 to 14B–9 are moved downwardly into their displaced positions.

When the talk-listen switch is in its upper and non-private listen position, other stations may select Station I to call it and they may listen to Station I. In the indicated private position, such listening cannot be effected. In the talk position, the station is conditioned for transmission to other stations.

When the talk-listen switch 14 is actuated to its upper non-private position, switch blades 14A–2 and 14A–3 are connected to an interstation line 44 which constitutes the station I home line, this connection being effected through the conductors 46, the switch blades 14A–2 and 14A–3, and conductors 48. At the same time, preferably, the amplifier is rendered inoperative by interruption of the B supply by switch blade 14A–1. Accordingly, other stations may select the Station I home line and may call it or listen to it, as will be explained in greater detail hereinafter when operation of the system will be described. The switch 14 is of a known type such that it remains in its upper and middle positions when actuated into them, but is spring returned from its lower talk position to its middle position.

The Station I home line 44 is connected also by the pair of conductors 50 to the intermediate stage amplifier input terminals 26 through resistors 52 which provide some attenuation of the signal supplied to this input and impedance matching. Thus, it will be noted that in the indicated position of the talk-listen switch, the home line 44 individual to Station I is effectively connected to the second stage amplifier input.

In the indicated private listen position of the talk-listen switch, the loud-speaker 12 is connected to the amplifier output terminals 30 through conductors 48, switch blades 14A–2 and 14A–3, conductors 54, switch blades 14B–1 and 14B–2, conductors 56, output volume control 58, and conductors 60. Thus, in the indicated private position of the talk-listen switch, various signals applied to the home line 44 individual to Station I are supplied to the second stage amplifier input amplified by the second stage and then supplied to the loud-speaker 12. It should be noted that in this position of the talk-listen switch, the amplifier is supplied with B potential through the switch blade 14A–1 and conductors 40 and thus rendered operative for amplification by the second stage.

Station I is provided with the previously referred to station selector switches 16, of which there may be as many as desired or necessary in connection with the number of units in the stations. As shown, there are the individual station selector switches 16–2 and 16–3 which are provided for the selection of Stations II and III. The upper two contacts 16–2A,B and 16–3A,B of each switch are connected to the conductors 62 which are connected to the talk-listen switch blades 14B–3 and 14B–4. In the indicated position of the talk-listen switch these switch blades connect the conductors 62 to the amplifier input terminals 22 through the conductors 64 and 66. This connection does not complete any circuit as long as the selector switches are open but should a selector switch be closed, then, as will be described later herein, the line 62 and a selected home line, individual to another station, are connected to the amplifier input.

The selector switch 16–2 is adapted to close a circuit to line 68 which is the home line for Station II and the selector switch 16–3 is adapted to close a circuit to the conductor 70 which is a line leading to Station III. When the talk-listen switch 14 is operated to its down or talk position, the switch blades 14B–1 to 14B–9 are moved from their indicated to their down positions. One result of this operation is the reversal of the connections of line 62 and loud-speaker 12 from the main input and output, respectively, of the amplifier to the output and main input. The result of this is that the loud-speaker is connected to the input and the output of the amplifier is connected to line 62 for transmission to the station selected by a selector switch 16. In the talk position, the second stage input is shorted by the switch blade 14B–5, this storting being effected through the conductors 72.

In operating switch 14 from the indicated private position to the talk position, the output of the amplifier is shorted temporarily by the switch blade 14B–6, the shorting being effected through the conductors 74. This shorting prevents transmission of switching noises and it should perhaps be noted further that the short circuit is effective only during movement of the switch from its private to its talk position and is not effective in the talk position.

The busy signal relay 20 has one terminal connected to B+ potential source 38 through conductor 76, resistor 78 and conductor 40. The other terminal is connected into the indicated private listen position to the midpoint of resistors 80 connected between the pair of conductors 62, this connection being made through conductor 82, switch blade 14B–7 and conductor 84. In the talk position of switch 14, the midpoint between resistors 80 is connected to ground through conductor 84, switch blade 14B–7 in its down position, and a conductor 86 which is connected to ground conductor 88. The circuit for the busy relay 20 is such that it is normally deenergized but is energized in the event of the selection of a busy station. At this time the relay is energized from its own B+ and through a ground connection at the busy station, which ground connection is made through the third blade of the other master station's selector switch 16 in its operated position, at which time it is connected to the ground conductor 88 at the other station.

In the event of the selection of a busy master station with the talk-listen switch in its middle position and resultant energization of relay 20, the amplifier at the calling station, in this case Station I, has the output from its first stage amplifier grounded thereby preventing double amplification as well as listening to or eavesdropping upon a selected station. This grounding is effected through conductor 90, connected to the interstage connection 36, conductor 92, switch blade 14B–9 in its indicated position, conductor 94 and switch blade 20–1 of the relay in its up position and conductor 96.

Upon selection of a busy master station, a busy signal light 98 is energized by the busy signal relay contact 20–2, which, in its up position, completes an energizing circuit for the light 98 through the secondary winding of a transformer 100.

When two stations are interconnected for communication, the busy signal relays 20 thereat are thus both energized. Consequently, the first stage amplifier output is shorted in the middle private listen position of the talk-listen switch. However, in the talk position, this shorting circuit is broken by opening of the circuit by switch blade 14B–9 in its down position. At the same time, i.e., in the talk position, the relay 20 is disconnected from line 62 by opening of the circuit 82—84 by switch blade 14B–7. In order to prevent relay 20 from being deenergized in this, the talk, position, it is held energized by a ground circuit through resistor 101 and switch blade 14B–8. This resistor has a value such as to limit current flow to a value to hold relay 20 in its operated position, but such as not to energize it sufficiently to move it there. Also, to maintain circuit 62 grounded in the talk position, the switch blade 14B–7 connects it to ground through conductors 84 and 86. Switch blades 14B–7 and 14B–8 are so adjusted that 14B–8 makes with ground before blade 14B–7 breaks from relay 20. This prevents the energized relay from becoming deenergized during operation of the talk-listen switch.

The output of the first stage amplifier is also shorted when one of the station selector switches 16 is operated. This shorting circuit extends from the interstage conductor 36 through conductor 90, conductor 100', a third switch blade 16–2C of station selector switch 16–2, a jumper conductor 102, switch blade 16–3C of the switch 16–3, jumper conductor 104, and the switch blade 18–C of the call-in switch 18 which is connected to ground conductor 88 through conductor 106. Thus, the output to the first stage amplifier is grounded as long as none of the station selector switches are operated and the call-in switch 18 is in its indicated position ready to receive buzzer calls from stations such as Station III through the call-in line 110. As shown, the call-in line 110 is connected through it to the uppermost switch blades 18A and 18B of switch 18 to a buzzer 112 which is connected to a source of power indicated by battery 114. Accordingly, whenever a circuit across the conductors 110 is completed at another station, the buzzer is energized.

When any selector switch is operated to select a station, the first stage amplifier shorting circuit is broken and Station I home line 44 is connected to ground through the midpoint of resistors 116 connected across the line, conductor 118, the third swtich blade C of the selector switch conductors 102 and 104 and switch blade 18–C. When the call-in switch 18 is operated, the shorting circuit is also broken and line 110 is connected to line 62 so communication can be carried on over line 110 as will be described later. In this position, home line 44 is grounded through the midpoint of resistors 116, conductor 118 and switch blade 18–C.

In order to prevent noises resulting from opening and closing the station selector switches, the C blades are arranged to open after the A and B blades are closed and to close before the A and B blades are opened. This arrangement results in the first stage amplifier output being shorted when the interstation line 68 is being connected to and disconnected from line 62.

The apparatus at Station II corresponds to that at Station I and, with few exceptions, the corresponding elements have been indicated by like reference numerals followed by the suffix –II. Among the exceptions are the station selector switch for Station I, which has been indicated by reference character 16–1; the previously noted Stations II and III interstation lines 68 and 70, and the ground conductor 88, used in signalling and not communication, which extends to all stations.

The apparatus at Station III includes a loud-speaker 120 connected by conductors 122 to a call-in switch 124 normally connecting the speaker to the line 70 individual to Station III. The switch 124 is operable to a first displaced position to connect the call-in line 110 to the line 122 whereby an energizing circuit is completed to the buzzer 112 at Station I. It is also operable to a second displaced position to call Station II through line 110–II.

At this point it should perhaps be mentioned that in the event other stations are added to the system, additional station selector switches 16 would be supplied for them by connections in the circuit following switch 16–2.

A brief general description of the operation of a system will now be given. It should be understood that while only a few stations have been illustrated, a system ordinarily will comprise many more. The system may include stations of the type of Stations I and II having individual home lines and station selector switches. The system may include also stations, such as Station III, which is commonly called a remote, slave, or speaker station, while Stations I and II are the type generally called master stations.

To begin with, it will be assumed that the system is idle and that the apparatus at Stations I and III are conditioned for operation with the various switches in their indicated position. Also to begin with, the apparatus at Station II will be considered to be conditioned for non-private listen operation by movement of its talk-listen switch 14–II to its uppermost position. In this position the amplifier 10–II is inoperative by reason of the fact that its B+ circuit is open and the loud-speaker 12–II is connected to the Station II home line 68.

Returning now to the apparatus at Station I, it will be remembered that in the indicated position of the talk-listen switch 14, Station I is conditioned for private listen operation. In this position of the talk-listen switch, the amplifier 10 is supplied with B potential through switch 14A–1 and is thus operative. Loud-speaker 12 is connected to the output of the amplifier, the low level input 22 of the amplifier is connected to the communication circuit 62, and the Station I home line 44 is connected to the high level input 26. The high level input 26 is unshorted, the amplifier output is unshorted, the busy relay 20 is connected to B+ but it is unenergized even though it is connected also to resistors 80 across line 62, this resulting from the fact that line 62 is open. Also, the first stage of amplifier 10 is not shorted by contact 20–1 of relay 20 although the output is shorted by the normally closed C series of contacts of the station selector switches and the call-in switch.

In the indicated private listen position the amplifier 10 is thus conditioned for amplifying signals received by it over its own home line 44. These signals are supplied to the high level input, amplified by the second stage amplifier, and supplied to the loud-speaker 12.

Reviewing the operation of the talk-listen switch somewhat further, when it is operated to the talk position, the loud-speaker 12 is connected to the low level input 22 and the amplifier output is connected to line 62. The high level input 26 is shorted through conductors 72 and in between the operation from listen to talk the amplifier output is short circuited briefly. The busy relay 20 is grounded through resistor 101 at its own station but as previously explained, this does not result in operation of relay 20 but only holding it operated if it had previously energized and moved to its operated position. At the same time relay 20 is disconnected from line 62 but the line is reconnected to ground through conductor 86 and switch blade 14B–7 in its lower position.

In further review it will thus be noted that transmission from Station I to other stations is effected through both the first and second stages of the amplifier. Received signals are amplified in both stages if received over line 62 but amplified only through the second stage if received over the line 44 which is the Station I home line. The circuits are so arranged that as far as the signal produced at Station I is concerned, the output of loud-speaker 12 is substantially at the same level irrespective of whether it is amplified by the two stages or single stage of amplification.

Returning now to the assumption that the loud-speaker 12–II at Station II is connected to its home line 68, then the operator at Station I can call Station II by closing the selector switch 16–2. This does two things at Station I, the first being the breaking of the short circuit across the first stage amplifier which is done by movement of switch blade 16–2C from its upper to its lower position. This movement also has the effect of grounding line 44 for busy signal purposes. Also, Station II home line 68 is connected to the line 62. The operator at Station I now operates the talk-listen switch to its lowermost position so that loud-speaker 12 is connected to the amplifier input and the amplifier output is connected to line 62 which has just been connected to loud-speaker 12–II. Consequently, signals may be transmitted from Station I to Station II. Also, if it is desired to carry on non-private conversation, as determined by the operator at Station II, then all that the operator at Station II has to do is simply to talk into his transducer 12–II. The direction of communication is controlled by the operator at Station I who operates the talk-listen switch between its lower talk and its middle private listen position. In this mode of operation the line 44 is not used and the relay 20 is not operated. However, as a consequence of the grounding of line 44, any other master station trying to select Station I would have its busy relay 20 energized by virtue of the connection to ground through line 44 and conductor 118 and the 16–2 switch at Station I. Also, should any station select Station II, which is now connected to circuit 62, the selecting station would have its busy signal relay energized in the talk position of the switch 14 at Station I.

One consequence of the energization of the busy signal at a third station selecting Station I or II would be closure of the switch 20–1 thereat which would effectively ground the first stage and thus prevent double amplification as well as any possible listening or eavesdropping.

It will now be assumed that the apparatus at Station II is in its indicated position and Station I desires to call it. The station selector switch 16–2 would be operated as previously, whereby line 62 at Station I would be connected to line 68 of Station II. In the indicated position of switch 14–II at Station II, line 68 is connected to the high level input of the second stage amplifier. When the operator at Station I depresses the switch 14 to the talk position, the loud-speaker 12 at Station I is connected to the amplifier input and the amplifier output is connected to line 62 and thus through line 68 to the second stage amplifier input at Station II. In this mode of operation both amplifiers are used but the attenuation provided by the resistors 52–II at Station II and the gain of the second stage of amplifier 10 at Station II are such that the signal supplied to loud-speaker 12–II is much the same as when it is called through Station I using both stages of amplification at Station I.

In order to respond to the call from Station I, the operator at Station II, in accordance with the preferred method of communication, closes the selector switch 16–1 at Station II. When this is done the busy signal relays 20 at the two stations are grounded and energized and the busy signal lights 98 are lighted. The first stage outputs are shorted through the switches 20–1 but as heretofore noted, this short circuit is broken in the talk position of the talk-listen switch at the respective stations. After the necessary station selector switches have been operated, the communication is carried on alternately in the two directions between the two stations by alternate operation of the talk-listen switches from their indicated position, which is the private listen position, to the talk position. During the conversation the busy relays of both stations will remain energized during operation of talk-listen switches, due to reasons previously explained, until the conversation is completed and the selector switches are returned to the off position.

Any station, i.e., master station selecting either Station I or II would have its busy signal relay 20 energized as a consequence of which the first stage amplifier output would be shorted and the busy signal lighted, to prevent eavesdropping and double amplification and to provide a busy signal.

In accordance with the present invention, both the master and remote stations are provided with means for signalling when another master station is listening to or eavesdropping upon another station. The signalling means are illustrated as the neon lamps 130, 130–II and 130–III at Stations I, II and III, respectively. The lamps 130 and 130–II are connected to the junctions of resistors 116 and 116–II and lamp 130–III is connected to the junction of resistor 126. The connection to the resistors is effected through conductors 132, 132–II and 132–III and to ground conductor 88 through conductors 133, 133–II and 133–III. The signalling means also includes the resistors 134 and 134–II at master Stations I and II connected from the busy signal relay 20 and resistor 78 to the ground conductor 88.

The resistors 134 are of values such as to place a suitable voltage at the junction of resistors 80 at Station I to operate the neon lamp 130 at Stations II and III upon selection of the station. This voltage has to be high enough to fire the neon lamp but not too high to exceed the rating of the lamp nor so high as to operate the busy signalling relay 20.

The signalling arrangement is thus such that when an operator at a master station, master Station I for example, selects Station III with switch 14 in its center (private-listen) or up (non-private-listen) position, then the neon lamp 130 at the remote station will be lighted to indicate to the person at the selected Station III that someone is eavesdropping. The circuit to lamp 130 is completed from the B supply at Station I, the circuit extending through resistor 78, the busy signal relay 20, conductor 82, switch 14B–7, conductor 84, resistors 80, conductors 62, station selector switch 16–3, interstation conductors 70, switch 124 at Station III, resistors 126, conductor 132–III, the lamp 130–III, conductor 133–III and the ground conductor 88. As already noted, the resistor 134 is chosen to be of a value such that the current necessary to fire lamp 130–III is not enough to operate the busy signal relay 20. The neon lamp at the remote station is deenergized in the talk position of switch 14 at the calling master station as a result of the grounding of circuit 62. As a result, the neon light at the remote station is energized only when Station I is able to eavesdrop or listen to Station III.

The operation for selection of Station III by master Station II is the same as described above.

Similarly, should either of master Stations I or II select the other with the latters talk listen switch in its up and idle position, the neon lamp 130 at the selected station will be lighted to give an indication of eavesdropping in the listen position of the switch 14 at the calling station.

The lighting of the signalling lamp 130 can be utilized as a calling means especially for calling the operator at Station III. Also, Station I can call Station III, by voice, by operating the Station III selector switch and operating the switch 14A to down and "Talk" position. The direction of communication is under the control of the operator at Station I who operates switch 14 between its middle and down positions to listen and talk, respectively. Any master station selecting either Station I or III when they are connected for communication would have its busy signal relay 20 energized thereby to silence the high level input and light the busy light thereat.

An operator at Station III can call a master station, for example Station I, by movement of its call-in switch 124 from its indicated position to line 110. This completes the circuit to the buzzer call-in 112 over the line 110 and through the switch blades 18A and 18B as previously described. To respond to the call the operator at Station I can do one of two things. He can close the Station III selector switch 16–3 or move the switch 18A to its lower position, which he must generally do in order to find out who is calling. Thereafter, communication can be carried on either over lines 70 or line 110. In either case, the Station I home line is grounded as is the line 62 as heretofore described.

While the present invention has been described in connection with the details of a preferred embodiment thereof, it should be understood that such details are not intended to be limitative of the invention except insofar as set forth in the accompanying claims.

What is claimed as new and is desired to be secured by Letters Patent of the United States is:

1. In an intercommunication system including a pair of stations at least one of which is a master station, an interstation communication circuit including a pair of conductors and adapted to be completed for reception at the master station from the other station, a pair of resistors at each of the stations connected across said interstation communication circuit, a signal circuit between stations, a signal light at the other station connected to the midpoint of the resistors thereat and to said signal circuit, a source of power at the master station having one terminal connected to said signal circuit, and means including station selector switch means at the master station for completing the interstation communication circuit for reception at the master station and connecting the power supply to the signal light through said communication and signal circuits thereby to indicate eavesdropping by the master station.

2. In an intercommunication system including a plurality of stations at least one of which is a master station, an interstation communication circuit including a pair of conductors and adapted to be completed for reception at the master station from another station, a pair of resistors at each of the stations connected across said interstation communication circuit, signal circuit between stations, a signal light at the master station connected to the midpoint of the resistors thereat and to said signal circuit, a source of power at the master station having one terminal connected to said signal circuit, and means including station selector switch means at the master station for completing the interstation communication circuit for reception at the master station and connecting the power supply to the signal light through said communication and signal circuits thereby to indicate eavesdropping by the master station.

3. In an intercommunication system including one or more master stations and one or more remote stations, an interstation communication circuit including a pair of conductors and adapted to be completed for reception at a master from a remote station or another master station, a busy signal relay at each master station, a signal light at each master station or remote station, a pair of resistors at each station connected across said interstation communication circuit, a signal circuit between stations, a circuit connecting the signal light at the called station to the midpoint of the resistors thereat and to said signal circuit, a source of power at a master station having one terminal connected to said signal circuit, a circuit connecting another terminal of the power supply to the midpoint of the resistors at a master station through said busy signal relay, means including station selector switch means at a master station for completing the interstation communication circuit for reception at the master station, and connecting the power supply to the signal light through said busy signal relay and communication circuit thereby to indicate eavesdropping by the master station.

4. In an intercommunication system including one or more master stations and one or more remote stations, an interstation communication circuit including a pair of conductors and adapted to be completed for reception at a master from a remote station, a busy signal relay at each master station, a signal light at each remote station, a pair of resistors at each of the master and remote stations connected across said interstation communication circuit, a signal circuit between stations, a circuit connecting the signal light at the remote station to the midpoint of the resistors thereat and to said signal circuit, a source of power at the master station having one terminal connected to said signal circuit, a circuit connecting another terminal of the power supply to the midpoint of the resistors at the master station through said busy signal relay, means including selector switch means at the master station for completing the interstation communication circuit for reception at the master station and connecting the power supply to the signal light through said busy signal relay and communication circuit thereby to indicate eavesdropping by the master station, and resistance means in circuit with said power supply and busy signal relay for providing a lamp lighting voltage sufficient to light the signal light but insufficient to operate said relay.

5. In an intercommunication system including a plurality of stations at least one of which is a master station, an interstation communication circuit including a pair of conductors and adapted to be completed for reception at a master station from another station, a pair of resistors at each of the stations connected across said interstation communication circuit, a signal circuit between stations, a signal light at the selected station connected to the midpoint of the resistors thereat and to said signal circuit, means including a busy signal relay connected to the junction of the resistors at the master station, a source of power at the master station having one terminal connected to said signal circuit and means including station selector switch means at the master station for completing the interstation communication circuit for reception at the master station and connecting the power supply to the signal light through said communicaion and signal circuits and said busy signal relay thereby to indicate eavesdropping by the master station, the last mentioned means being arranged so that the busy signal relay remains unoperated upon completion of said circuit.

6. In an intercommunication system including one or more master stations and one or more remote stations, an interstation communication circuit including a pair of conductors and adapted to be completed for reception at a master and remote station, a pair of resistors at each of the master and remote stations connected across said interstation communication circuit, a signal circuit between stations, a signal light at the remote station connected to the midpoint of the resistors thereat and to said signal circuit, means including a busy signal relay connected to the junction of the resistors at the master station, a source of power at the master station having one terminal connected to said signal circuit and means including station selector switch means at the master station for completing the interstation communication circuit for reception at the master station and connecting the power supply to the signal light through said communication and signal circuits and said busy signal relay thereby to indicate eavesdropping by the master station, the last mentioned means being arranged so that the busy signal relay remains unoperated upon completion of said circuit.

References Cited in the file of this patent

UNITED STATES PATENTS

| | | |
|---|---|---|
| 2,390,203 | Campbell | Dec. 4, 1945 |
| 2,496,398 | Lambert | Feb. 7, 1950 |
| 2,567,484 | Ivens | Sept. 11, 1951 |
| 2,629,022 | Wall | Feb. 17, 1953 |
| 2,783,308 | Campbell | Feb. 26, 1957 |